United States Patent
Kelley et al.

(10) Patent No.: US 6,760,793 B2
(45) Date of Patent: Jul. 6, 2004

(54) TRANSACTION CREDIT CONTROL FOR SERIAL I/O SYSTEMS

(75) Inventors: Richard A. Kelley, Lake Worth, FL (US); Danny Marvin Neal, Round Rock, TX (US)

(73) Assignee: ISYS Technologies, Inc., Hutto, TX (US)

( * ) Notice: Subject to any disclaimer, the term of this patent is extended or adjusted under 35 U.S.C. 154(b) by 62 days.

(21) Appl. No.: 10/207,449

(22) Filed: Jul. 29, 2002

(65) Prior Publication Data

US 2004/0019714 A1 Jan. 29, 2004

(51) Int. Cl.[7] .................................................. G06F 3/02
(52) U.S. Cl. .......................................... 710/52; 710/29
(58) Field of Search ........................... 710/52, 310, 29; 709/233, 234, 235

(56) References Cited

U.S. PATENT DOCUMENTS

| | | | | |
|---|---|---|---|---|
| 5,604,866 A | * | 2/1997 | Kolb et al. | 709/235 |
| 6,115,761 A | * | 9/2000 | Daniel et al. | 710/57 |
| 6,347,337 B1 | * | 2/2002 | Shah et al. | 709/224 |
| 6,493,776 B1 | * | 12/2002 | Courtright et al. | 710/110 |
| 6,618,354 B1 | * | 9/2003 | Sharma | 370/229 |
| 2002/0146022 A1 | * | 10/2002 | Van Doren et al. | 370/412 |
| 2002/0158992 A1 | * | 10/2002 | Yeo et al. | 348/729 |
| 2003/0115513 A1 | * | 6/2003 | Harriman et al. | 714/49 |

OTHER PUBLICATIONS

H.T. Hung et al., "Use of Link–by–Link Flow Control in Maximizing ATM Network Performance: Simulation Results", IEEE Hot Interconnects Symposium '93, Modified Nov. 1, 1993.*

H.T. Hung et al., "Credit–Based Flow Control for ATM Networks", IEEE Network Magazine, Mar. 1995.*

Electronic Design, "3GIO Named Successor to PCI/PCI–X", Ray Weiss, Oct. 29, 2001.*

Electronic Design, "PCI Scales New Heights with Switch-Fabric Interconnects", Tim Miller, Apr. 29, 2002.*

Ajay Bhatt, "Creating a Third Generation I/O Interconnect" (White Paper), Copyright 2001.*

* cited by examiner

Primary Examiner—Fritz Fleming
(74) Attorney, Agent, or Firm—Robert V. Wilder

(57) ABSTRACT

A method and implementing computer system are provided which allows for significantly improved input/output (I/O) subsystem designs in all systems which include serialized I/O transactions such as so-called Express specification systems. Transaction control methodology is implemented to improve Express design requirements for Express devices such as an Express switch, Express-PCI bridge, endpoint, and root complex. This is accomplished by utilizing improved transaction ordering and state machine and corresponding buffer design and improved flow control credit methodology which enables improved processing for controlling transactions flowing through Express devices including Express switches and Express-PCI bridges. An Express-PCI/PCIX transition bridge design is also provided, along with the flow control credit methodology and implementation within the Express-PCI/PCIX bridge design to enable efficient interfacing between Express and legacy or existing PCI/PCIX systems.

17 Claims, 10 Drawing Sheets

|  | FIRST TRANSACTION | | | | |
|---|---|---|---|---|---|
| SECOND TRANSACTION | PMW COL 2 | RR COL 3 | WR COL 4 | RC COL 5 | WC COL 6 |
| PMW ROW A | A) NO B) Y/N | YES | YES | YES | YES |
| RR ROW B | NO | NO | NO | Y/N | Y/N |
| WR ROW C | NO | NO | NO | Y/N | Y/N |
| RC ROW D | A) NO B) Y/N | YES | YES | A) Y/N B) NO | Y/N |
| WC ROW E | Y/N | YES | YES | Y/N | Y/N |

YES - THE SECOND TRANSACTION MUST BE ALLOWED TO PASS THE FIRST TO AVOID DEADLOCK

NO - THE SECOND TRANSACTION MUST NOT BE ALLOWED TO PASS THE FIRST TRANSACTION, TO PRESERVE STRONG WRITE ORDERING

Y/N - THERE ARE NO ORDERING REQUIREMENTS. THE SECOND TRANSACTION MAY OPTIONALLY PASS THE FIRST TRANSACTION OR BE BLOCKED BY IT

*FIG. 4*

| EXPRESS TRAFFIC CLASSES ||
|---|---|
| 000 | LOWEST PRIORITY - GEN PURPOSE I/O |
| 001 | OTHER DIFFERENTIATED PRIORITY |
| 010 | OTHER DIFFERENTIATED PRIORITY |
| 011 | OTHER DIFFERENTIATED PRIORITY |
| 100 | OTHER DIFFERENTIATED PRIORITY |
| 101 | OTHER DIFFERENTIATED PRIORITY |
| 110 | OTHER DIFFERENTIATED PRIORITY |
| 111 | HIGHEST PRIORITY - ISOCHRONOUS |

*FIG. 5*

TRANSACTION CREDIT CONTROL FOR SERIAL I/O SYSTEMS

RELATED APPLICATIONS

Subject matter disclosed and not claimed herein is disclosed and claimed in related co-pending applications Ser. Nos. 10/207,471 and 10/207,433, which were filed on Jul. 29, 2002.

FIELD OF THE INVENTION

The present invention relates generally to information processing systems and more particular to a methodology and implemention for buffer management and transaction control for serialized input/output transactions.

BACKGROUND OF THE INVENTION

In computer systems today, the predominate input/output (I/O) subsystem in Notebooks, desktops, and servers is based on either the so-called PCI (peripheral component interconnect) or PCIX bus (see the Revision 2.3 PCI Local Bus Specification dated Mar. 29, 2002, and the Revision 1.0a PCIX Addendum to the PCI Local Bus Specification dated Jul. 24, 2000). However, in order to keep pace with the growing need to provide improved performance and scalability needs of the future, the PCI-SIG (Peripheral Component Interconnect Special Interest Group) is adopting a new PCI interconnect called "PCI Express", herein after referred to as "Express". Express is also referred to as "3GIO" in some versions of the Express specification. Express is a serial point-to-point switched fabric interconnect that utilizes the same programming model as the current PCI and PCIX bus definitions. PCI and PCIX provide a set of transaction ordering rules that define the requirements as to whether a second transaction of various transaction types must be allowed or not allowed to bypass a first transaction of various transaction types. These transaction ordering rules result in significant complexity in PCI and PCIX devices, especially for PCIX—PCIX (and PCI—PCI) bridges. Express also introduces the concept of multi-port switches. The Express specification defines an Express switch as a logical assembly of multiple virtual PCI—PCI bridge devices that have one primary interface and multiple secondary interfaces, with each external interface being an Express serial interface. An Express switch by definition is even more complex than today's typical PCIX—PCIX bridge (which are themselves very complex devices). Express carries over the transaction ordering rules of PCI essentially unchanged, such that when adding the serial nature and other features of Express, this results in very significant complexity for Express devices and introduces other problems.

Thus, there is a need for an improved method, circuit, and system for Express switches, Express-PCI bridges and other Express devices to improve transaction ordering and buffer management requirements for data consistency, and also to avoid data transfer congestion and deadlocks.

SUMMARY OF THE INVENTION

A method and implementing computer system are provided which allow for much improved input/output (I/O) subsystem designs for use in serialized I/O transaction systems including Express systems. To achieve improved scalability, Express adds to PCI/PCIX a serial point-to-point signaling capability at the Express link and chip interface. This invention defines means to greatly improve Express design requirements, making the design of Express devices such as an Express switch, Express-PCI bridge, endpoint, or root complex more efficient, less complex and therefore less costly. This is accomplished by improving the requirements for input buffer designs and transaction credit types and credit control for managing the flow of transactions across a serial I/O link. An improved transaction credit and flow control is provided which results in significant performance improvements as transactions flow through Express devices and over Express links.

BRIEF DESCRIPTION OF THE DRAWINGS

A better understanding of the present invention can be obtained when the following detailed description of a preferred embodiment is considered in conjunction with the following drawings, in which:

FIG. 4 illustrates an exemplary embodiment of improved transaction ordering requirements for the PCI/PCIX domain in Express-PCI bridges;

FIG. 5 illustrates a description of the Express Traffic Classes;

DETAILED DESCRIPTION

The exemplary embodiment of the present invention is described herein relative to the so-called "Express" Specification although it is understood that the invention is not limited to the Express system but rather applies to other systems which include serialized I/O transactions. The current Express Base Specification includes a definition for transaction ordering rules that are essentially the same as the ordering rules for PCI and PCIX as defined in the Revision 2.3 PCI Local Bus Specification dated Mar. 29, 2002, and the Revision 1.0a PCIX Addendum to the PCI Local Bus Specification dated Jul. 24, 2000. To achieve improved scalability Express adds serial signaling capability at the Express link and chip interface and other improvements. The addition of scalability improvements increases the design complexity of Express chips, especially for the Express switch devices as well as for End Points and Root Complex. The current PCI and PCIX transaction ordering requirements only add to this design complexity with complex transaction ordering requirements, where some transactions must be allowed to bypass certain other transactions, and while some transactions must not be allowed to bypass certain other transactions. This invention defines means to significantly improve the transaction ordering requirements, buffer management, flow credit definition and control, and other improvements for Express, making the design of Express devices much less complex, less costly, with higher performance, and while avoiding congestion and deadlock, especially for Express switch and Express-bridge designs.

The various methods discussed herein may be implemented within a computer network including a computer system which may comprise either a server, workstation, or a PC for example. In general, an implementing computer system may include computers configured with a plurality of processors in a multi-bus system in a network of similar systems. However, since the workstation, computer system, or server implementing the present invention in an exemplary embodiment, is generally known in the art and composed of electronic components and circuits which are also generally known to those skilled in the art, circuit details beyond those shown in FIG. 1, are not specified to any greater extent than that considered necessary as illustrated, for the understanding and appreciation of the underlying concepts of the present invention and in order not to obfuscate or distract from the teachings of the present invention.

Figure 1:
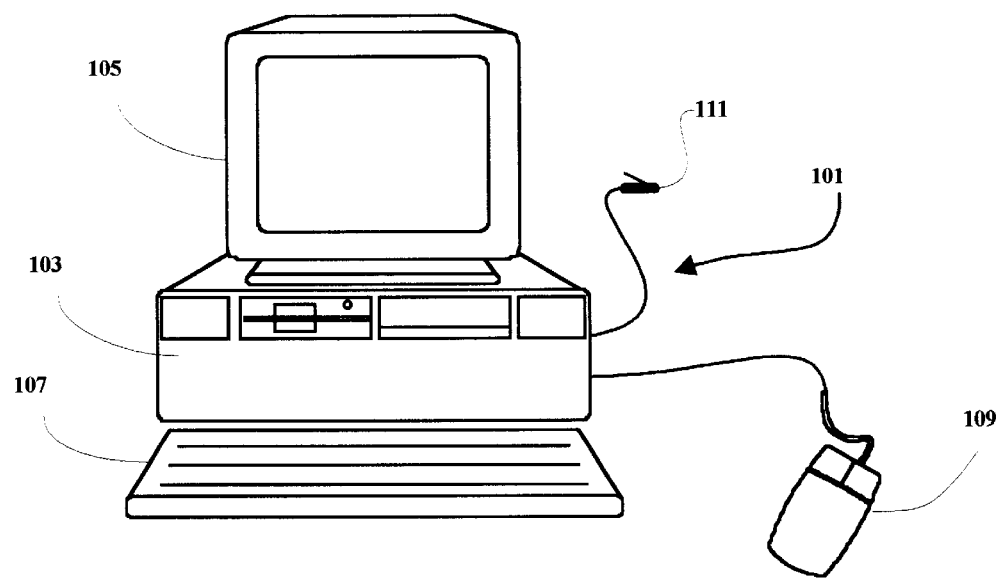
FIG. 1 is an illustration of a computer station, which is enabled for connection to a computer network.

In FIG. 1, an exemplary computer system 101 includes a processor unit 103 which is typically arranged for housing a processor circuit along with other component devices and subsystems of the computer system 101. The computer system 101 also includes a monitor unit 105, a keyboard 107 and a mouse or pointing device 109, which are all interconnected with the computer system illustrated. Also shown is a connector 111 which is arranged for connecting a modem within the computer system to a communication line such as a telephone line in the present example.

Figure 2:
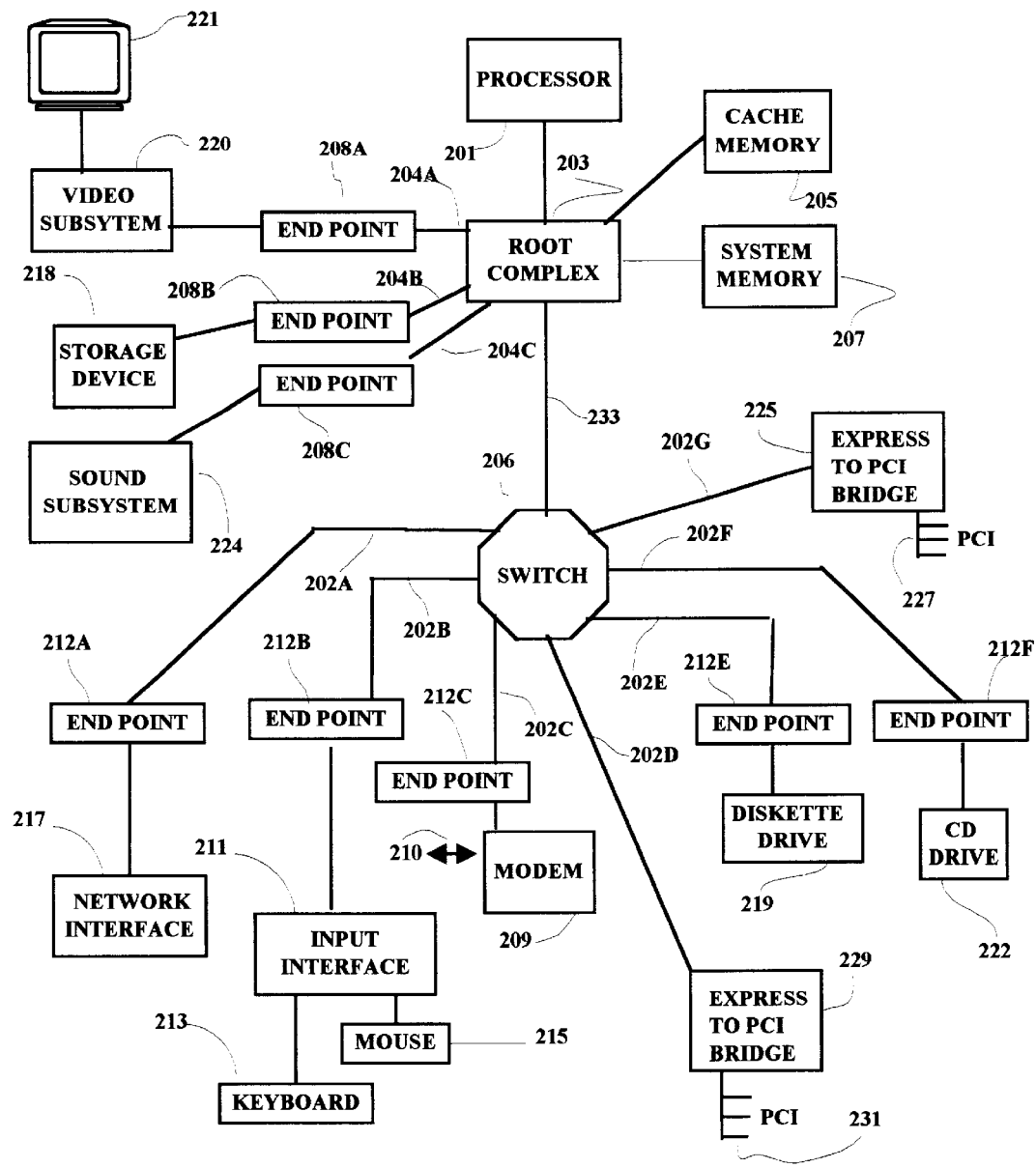
FIG. 2 illustrates several major components of the computer system of FIG. 1.

Several of the major components of the system 101 are illustrated in FIG. 2. Referring to FIG. 2, a processor circuit 201 is connected to a root complex 203 which denotes the root of an I/O hierarchy that connects the processor and memory subsystem to the I/O. It is noted that the processing methodology disclosed herein will apply to many different interconnect and/or network configurations. A cache memory device 205, and a system memory unit 207 are also connected to the root complex 203. Also connected to the root complex are several Express serial point-to-point connections 204A, 204B and 204C connecting to several corresponding Express endpoints 208A, 208B and 208C. An endpoint refers to a type of device that can be the requester or completer of an Express transaction whether on its own behalf or on behalf of a distinct non-Express device (other than a PCI device or host processor). Also connected to the root complex 203 over an Express link 233 in FIG. 2 is an Express switch 206. The switch 206 also includes a number of additional Express links 202A–202G, respectively. Connected to Express links 202A, 202B, 202C, 202E and 202F are a number of additional endpoints 212A, 212B, 212C, 212E and 212F, respectively. Endpoint 208B is connected to a storage device 218 and endpoint 208C is connected to a sound subsystem 224 in the FIG. 2 example. A modem 209 is arranged for connection 210 to a communication line, such as a telephone line, through a connector 111 (FIG. 1). The modem 209, in the present example, selectively enables the computer system 101 to establish a communication link and initiate communication with a network server, such as through the Internet.

Endpoint 212B is connected through an input interface circuit 211 to a keyboard 213 and a mouse or pointing device 215. Endpoint 212A is coupled to a network through a network interface 217 in the example. A diskette drive unit 219 is also shown as being coupled to an endpoint 212E. A video subsystem 220, which may include a graphics subsystem, is connected between endpoint 208A and a display device 221. A storage device 218, which may comprise a hard drive unit, is also coupled to an endpoint 208B. The diskette drive unit provides a means by which individual diskette programs may be loaded on to the hard drive, or accessed directly, for selective execution by the computer system 101. As is well known, program diskettes containing application programs represented by magnetic media on the diskette, or optically readable indicia on a CD, may be read from the diskette or CD drive, and the computer system is selectively operable to read such media and create program signals. Such program signals are selectively effective to cause the computer system to present displays on the screen of a display device and respond to user inputs in accordance with the functional flow of an application program. Again referring to FIG. 2, an Express-PCI bridge 225 is included which provides for attachment of legacy (i.e. earlier version devices) PCI and PCIX devices to PCI bus 227. The Express to PCI bridge 225 is coupled through link 202G to the switch 206. A second Express-PCI bridge 229 is coupled through link 202D to switch 206. Express-PCI bridge 229 also provides an additional PCI/PCIX bus 231.

Figure 3:
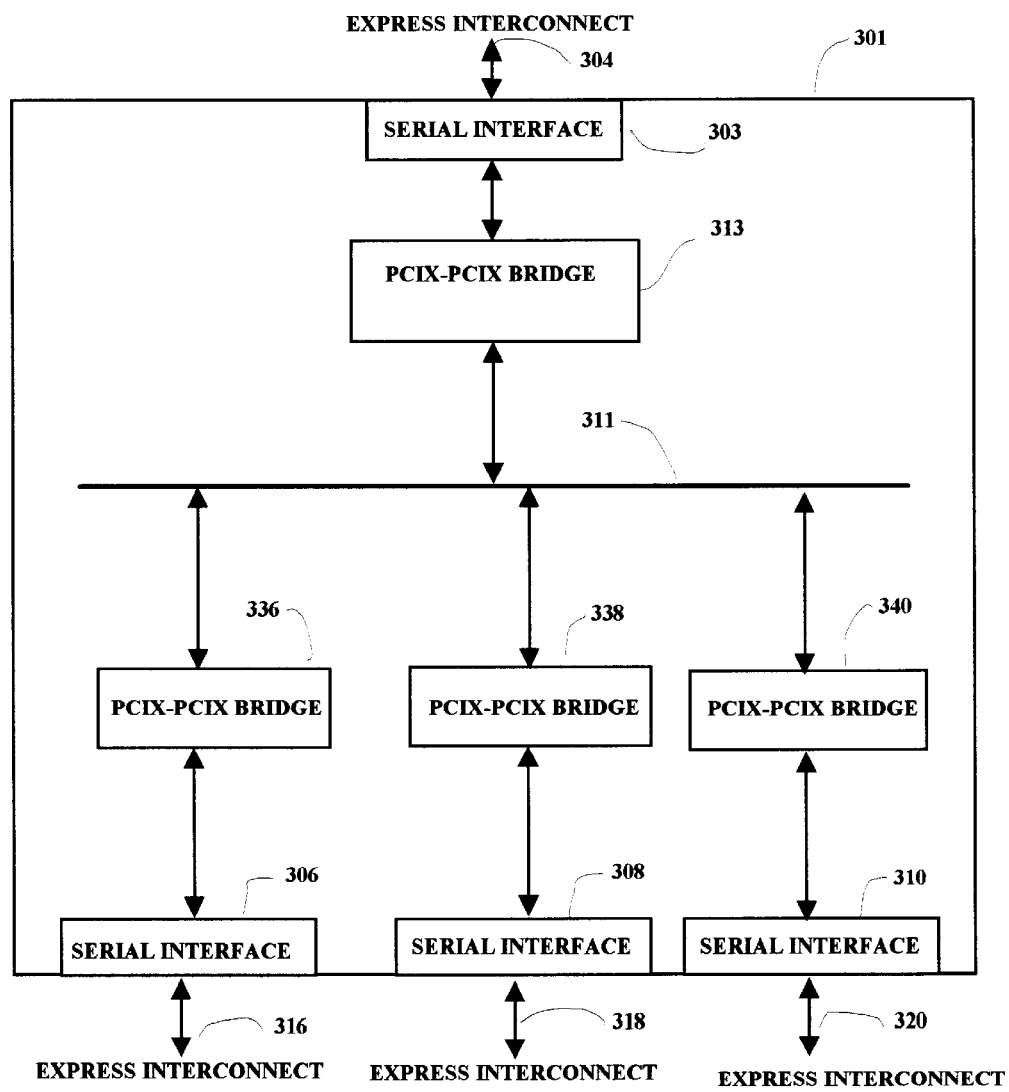
FIG. 3 illustrates a high level logical block diagram of an Express switch.

FIG. 3 illustrates a high level block diagram of an Express switch or bridge 301. The Express specification defines an Express switch as a logical assembly of multiple virtual PCI—PCI bridge (or PCIX—PCIX bridge) devices. The upstream port of the Express switch or bridge 301 provides an Express interface 303 to an Express link 304. The "upstream" port interface 303 is closer to the system processor. The Express switch 301 also includes multiple downstream ports providing downstream Express interfaces 306, 308 and 310 to additional Express links 316, 318 and 320, respectively. Connected to the upstream interface is a logical PCIX—PCIX bridge 313 which in turn connects to an internal PCIX bus 311. Also connected to the PCIX bus 311 are multiple logical PCIX—PCIX bridges 336, 338 and 340 which in turn connect through their respective downstream Express interface circuits 306, 308 and 310 to Express interconnects 316, 318 and 320. The Express switch which contains multiple virtual PCIX—PCIX bridges, is by definition much more complex than a typical PCI—PCI bridge (or PCIX—PCIX bridge) that contains one upstream port and only one downstream port.

With Express, transactions and data are moved within the Express "fabric" via packets. A packet is a fundamental unit of information transfer consisting of a header that, in some cases, is followed by a data payload. The Express architecture also includes a definition of a traffic class (TC) as defined by a 3-bit field such as "000" or "111". FIG. 5 illustrates a definition of Express traffic classes. The traffic class allows differentiation of transactions from different devices into eight traffic classes. The lowest TC (000) is utilized for general purpose I/O and must be supported by all Express devices. The highest TC (111) is utilized for isochronous transactions that have real time priority requirements. The other TC 3-bit combinations represent other differentiated service classes (differentiated based on weighted-round-robin and/or other priority processing requirements).

Express also supports the concept of "virtual channels" (VC). Virtual channels provide a means to implement multiple logical data flows for different devices over a given physical link. Each link must support at lease one virtual channel, VC(0). The TC field is transmitted unmodified end-to-end through the fabric and is used by each component to determine how to process the packet relative to other packets within the component. Together with the Express virtual channel support, the TC mechanism is a fundamental element of Express for enabling differentiated traffic servicing. As a packet traverses the fabric, this information is used at every link and within each switch element to make decisions relative to proper servicing of the traffic, such as the routing of the packets based on their TC labels through corresponding virtual channels. It is up to the system software to determine TC labels and the TC/VC mapping in order to provide differentiated services that meet target platform requirements. An example would be a system that supports isochronous transactions. In this case TC7 (111) would be utilized for isochronous transactions and TC7 must be mapped to the VC with the highest weight/priority.

Traffic between Express devices over an Express link is managed via a flow control mechanism. Express defines flow control as a method for communicating receiver buffer information from a receiver to a transmitter to prevent receiver buffer overflow. Flow control credits are issued by a receiver to the transmitter, indicating whether and how many transactions or how much data the transmitter can send to the receiver. A transmitter cannot send a transaction or data to a receiver unless it has the appropriate flow control credits.

The key parts of VCs are the independent fabric resources (queues/buffers and associated control logic). These resources are used to move information across Express links fully independently of flow control between different VCs. This avoids flow control induced blocking where a single traffic class may create a bottleneck for all traffic in the system. Traffic is associated with VCs by mapping packets with particular TC labels to their corresponding VCs. The Express VC mechanism allows flexible mapping of TCs onto the VCs. In the simplest form, TCs can be mapped to VCs on a one-to-one basis. To allow performance/cost tradeoffs, Express also allows mapping of TCs to a single VC.

FIG. 4 illustrates improved transaction ordering requirements 401 for the PCI domain of the Express-PCI bridge. In FIG. 4, the top row represents the first transaction of a sequence. Each column in the top row is designated with one of several types of transactions which could occur as the first transaction. For example, the first transaction could be a posted memory write (PMW) as shown in column 2 or a read request (RR) as shown in column 3, a write request (WR) as shown in column 4, a read completion (RC) as shown in column 5 or a write completion (WC) as shown in column 6. In the Rows A–E are illustrated the second transaction of the sequence which follows the transaction type designated in the top row. Contained at the intersection of a column (any one of the listed columns) and a row (any one of the listed rows) is illustrated the transaction ordering rule, that is, the entry indicates whether the second transaction in a sequence must be allowed or not allowed to bypass the first transaction in a sequence as the second transaction makes its way through the PCI/PCIX domain of the Express-PCI bridge device in the direction the transaction is flowing. In FIG. 4, the transaction ordering rules all apply to transactions flowing in the same direction. Transactions flowing in the upstream direction have no ordering requirements relative to transactions flowing in the downstream direction.

FIG. 4 also includes a definition of the table entries. A "Y" or "YES" designation in a block means that the second transaction (in the corresponding row) must be allowed to pass the first transaction (in the corresponding column) to avoid deadlock. A "N" or "NO" designation means that the second transaction (in the corresponding row) must not be allowed to pass the first transaction (in the corresponding column) to preserve strong write ordering. A "Y/N" indicates there are no ordering requirements between the first and second transaction, that is the second transaction may optionally pass the first transaction or be blocked by it.

Again referring to FIG. 4, there are 5 transaction types shown in the columns from left to right, and in the rows from top to bottom respectively, a posted memory write (PMW), A read request (RR), a write request (WR), a read completion (RC), and also a write completion (WC). As used herein, references to write requests to I/O or configuration space, are referred to as write requests, and write completions from I/O or configuration space are referred to as write completions. Also in this document reference to write requests to memory space are referred to as posted memory writes. As used herein, a "posted" memory write is a transaction that has completed on the originating bus before completing on the destination bus. The ordering rules defined in the Express specification result in very complex Express implementations, and combined with other Express features can result in stalling and potential deadlock and/or system crashes.

One problem with current PCI systems relative to possible deadlocks is that Delayed Read Requests and Delayed Write Requests leave residual transactions (once the transaction has been attempted) at the head of buffers which can cause deadlocks if proper bypassing rules are not followed. Examples of residual transactions are Delayed Requests (Delayed Read and Delayed Write) which have been accepted across a device interface. Once a Delayed Request is attempted across a bus from a first device to a second device, the request is now in the second device, but the request also leaves the same Delayed Request at the head of the queue in the first device. The delayed request must continue to be attempted from the first device to the second device until the completion transaction becomes available. Once the completion transaction is available and the delayed request completes, the Delayed Request in the first device is destroyed, being replaced by the Delayed Completion transaction now in the first device and moving in the opposite direction. For PCI, by definition, delayed request transactions result in residual delayed requests at the head of the buffer queues. These residual requests require bypassing rules in order to allow certain transactions to be able to bypass these residual transactions to avoid deadlocks. PCIX devices are required to be fully backward compatible with PCI, such that whenever a PCI device is installed on that bus segment, the PCIX devices on that bus segment must operate in PCI mode.

The current definition of Express has carried over these same transaction ordering requirements of PCI/PCIX with very little difference and indicates that those transaction ordering requirements are required throughout the Express fabric (including Express switches and Express-PCI bridges). In accordance with the present disclosure, residual transactions are not needed and are not utilized in Express devices or in the Express domain of Express-PCI bridges. Therefore the complex ordering requirements (as described in the Express specification), complex buffer design, and complex transaction ordering state machine required in PCI/PCIX bridges and devices, are not needed in Express devices such as an Express switch and the Express domain of an Express-PCI bridge. Also, since Express utilizes a token credit based flow control mechanism to help control the issuing of transactions across the Express link, transactions are not attempted across an Express link unless the requester has received "credits" indicating there is space available on the other side of the link for the transaction. Once the transaction is attempted it completes across the link, resulting in no need for a residual copy of the transaction on the requester side of the link. As a result, there are no requirements for second transactions to bypass first transactions within the Express domain.

This improved methodology avoids any need for bypassing in the Express domain and allows the Express transaction buffers to be implemented as a single input buffer set and a single output buffer set with much less complex ordering requirements in which transactions exit the buffer sets in the same order as they entered the buffer sets. In the simplest case for an Express switch, only one input buffer set and only one output buffer set are required at each port (if the optional isochronous capability were not supported, and if only one VC were supported). If isochronous capability and multiple VCs are supported, then the input and output buffer sets as described would be implemented for each port and for each virtual channel. There are no ordering requirements for transactions flowing through different virtual channels. However, a fairness processing algorithm within internal arbiters must be utilized for resolving which transactions at the head of a given buffer set are given access to a given target port. The complex buffer designs and complex ordering rules state machine which are required for PCI are not required for Express devices which are implemented in accordance with the present disclosure. Instead, prior complex implementations can be replaced with the improved embodiments of this invention.

Figure 7:
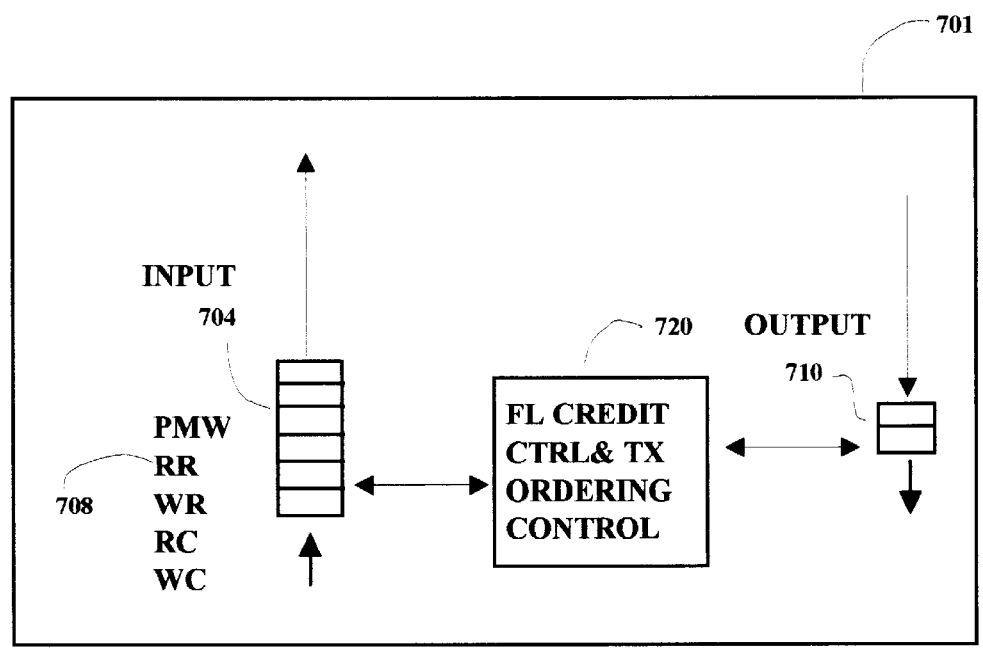
FIG. 7 illustrates an exemplary embodiment of Express buffers utilizing improved Express transaction ordering and buffer management.
Figure 8:
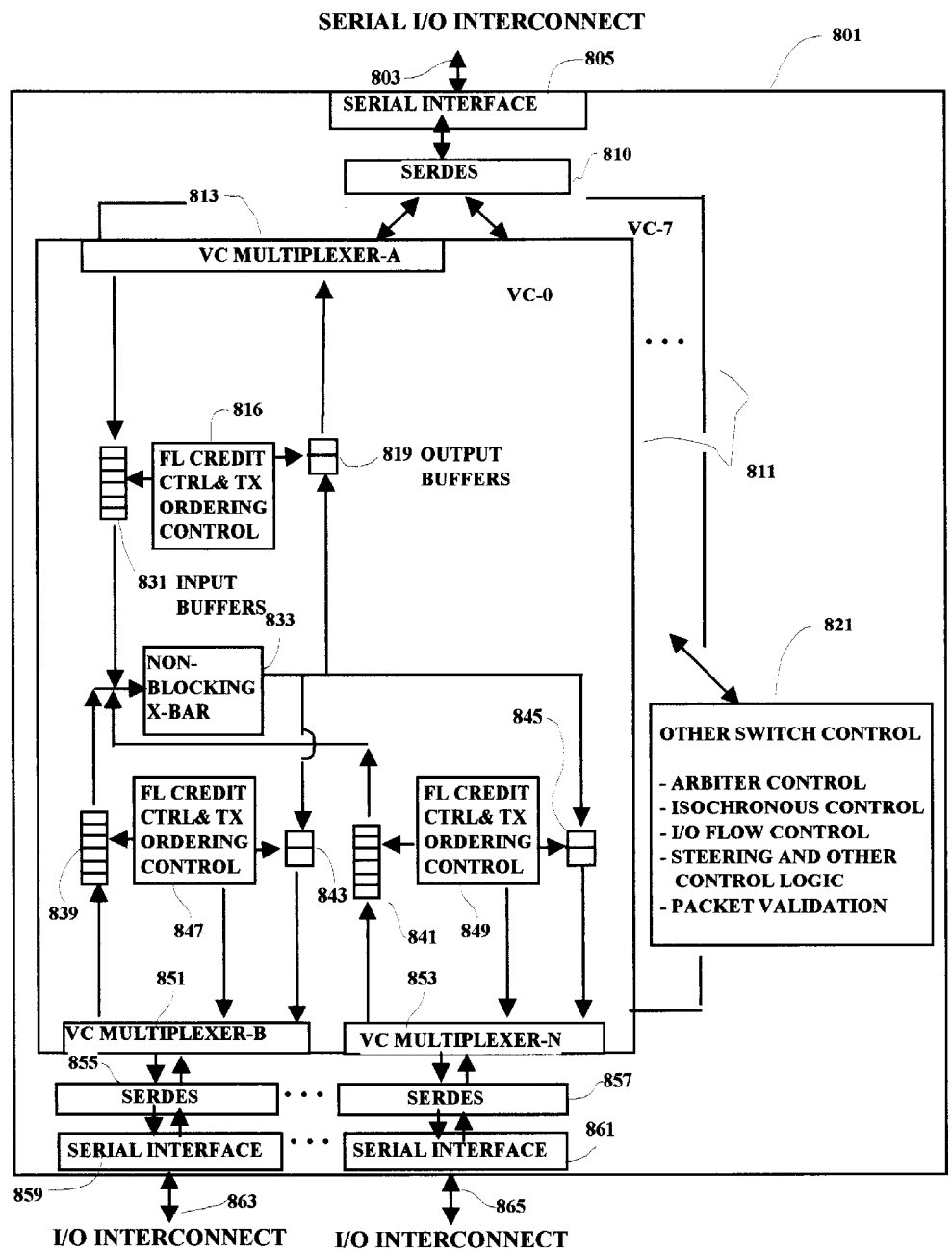
FIG. 8 illustrates an exemplary Express switch embodiment utilizing improved Express transaction ordering and buffer management.

These improvements are described in more detail in FIG. 7 and FIG. 8.

With the current Express specification, the potential exists for stalling of transactions in the Express fabric, resulting in potential of system crashes due to the processor overrunning the work capacity of I/O devices. If the device driver sends more commands to its device than the device can handle at a time, the device will get behind in the processing of the commands. This can result in transactions backing up into the Express fabric resulting in a stalling condition and the potential system crashes. A device driver needs to be aware of the number of tasks a device is able to queue up after which it would cause Express to back up into the fabric.

Figure 6:
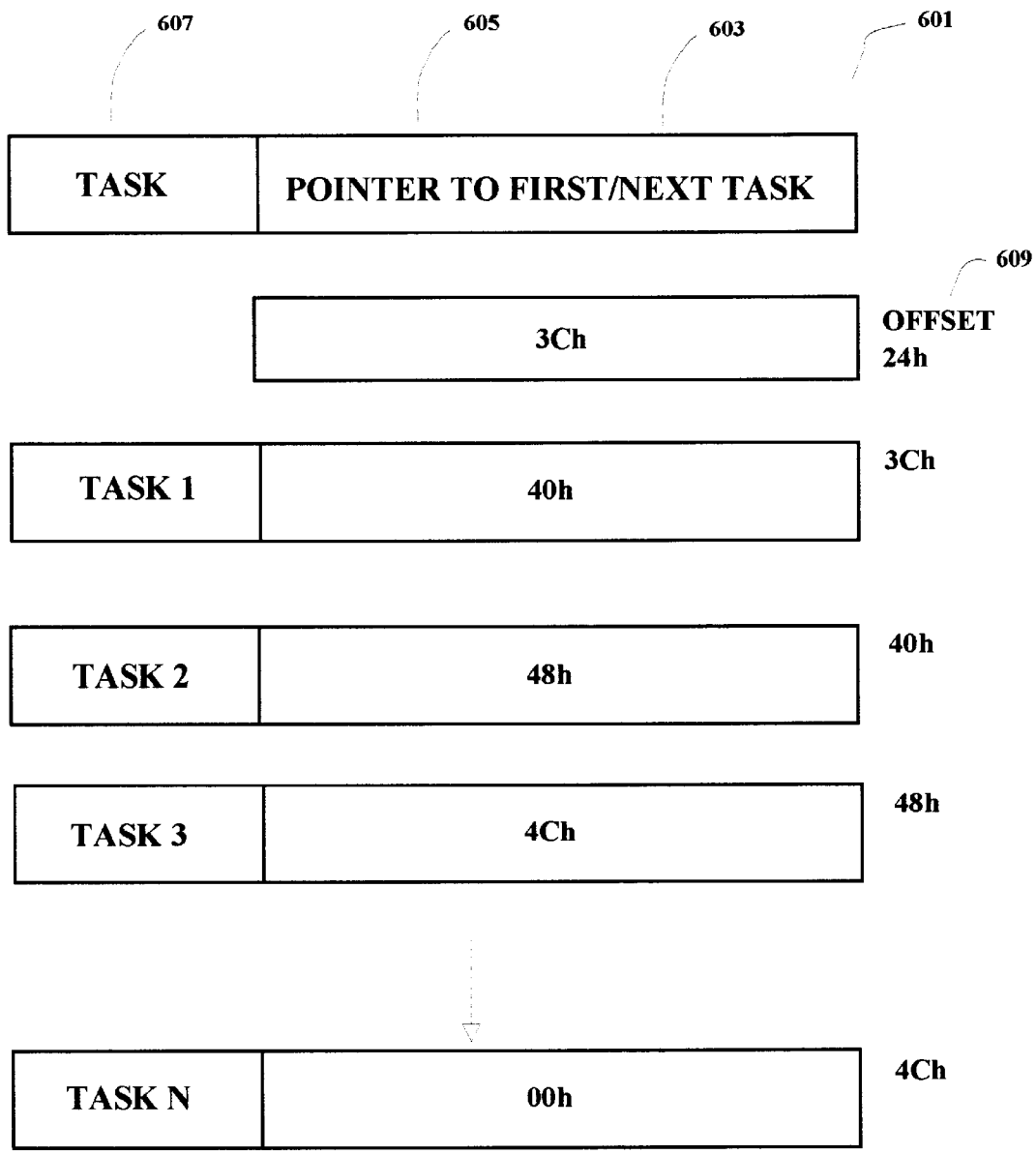
FIG. 6 illustrates and exemplary embodiment for avoiding congestion and potential system crashes due to overrun of device workload capacity.

FIG. 6 illustrates an exemplary embodiment for device drivers and devices to track outstanding work tasks 601. There are a number of ways in which this could be accomplished. However, a preferred embodiment is to utilize a link list of tasks in system memory. Referring to FIG. 6, the link list would begin at some assigned offset, for example 24 h 609. The "h" designation represents hexadecimal notation. Each task 607 would be posted by the device driver in the link list in system memory, and also a pointer to the first or next task 605 would be included in the list, which would point to the next entry in the list. For example, the first pointer at the offset 609 is to an address of 3Ch. Additional exemplary pointers shown in hexadecimal are also included in FIG. 6. The device would pick up new work tasks to be handled by checking the task list in memory. Once the device completes a task or set of tasks, the device posts an interrupt to the process indicating which task or tasks have been completed. The device driver then updates the link list in system memory, posting any new tasks that need to be executed.

With this tracking mechanism, the device driver needs to be aware of how many tasks the device can accept at a time, and can assure that it never assigns the device more work tasks than its capacity to handle. Whenever the device driver updates the task list in memory, it then accesses the device indicating that an updated task list is available in system memory. In this manner, the device should always be able to accept the read or write accesses to the device from the processor (device driver), thus avoiding backing up processor access attempts to the device into the Express fabric. This objective may also be accomplished by the device driver sending the tasks directly to the device followed by the device indicating completion of a task or tasks with an interrupt. However, this would require more accesses to the device than the preferred embodiment described above, resulting in lower performance.

FIG. 7 is a schematic diagram illustrating a preferred embodiment for a portion of an Express switch 701 which is a significantly improved approach according to this invention utilizing only one input buffer set 704 and only one output buffer set 710. The exemplary embodiment illustrated in FIG. 7 is for one port and one virtual channel. Transactions entering the input buffer set 704 of a given port come from the I/O interconnect and deserializer at that port. Transactions entering the output buffer set 710 of a given port can come from any other port of that switch. This improved approach can be accomplished because the improved transaction ordering requirements for Express results in the need for only one input buffer set 704 and only one output buffer set 710. The buffer sets are organized such that transactions of all types flow through them in such a manner that transactions exit the buffers in the same order or sequence as they entered. Also illustrated in FIG. 7 is a set of all five of the transaction types 708, i.e. PMW (Posted Memory Write), RR (Read Request), WR (Write Request), RC (Read Completion), and WC (Write Completion), which can flow through the single input buffer sets. Similarly, all transaction types can flow through the output buffer sets 710. Transaction flows through the buffers are managed through Flow Control Credits and Transaction Ordering Control circuitry 720.

FIG. 8 illustrates a detailed drawing of a preferred embodiment for an Express switch device such as switch 206 in FIG. 2. In FIG. 8, a multi-port Express switch 801 has a single upstream (toward the processor) Express serial port 805 producing a serial I/O interconnect 803, and multiple downstream Express serial ports 859 and 861 producing serial I/O interconnects 863 and 865, respectively. Express allows up to eight (8) virtual channels, which are illustrated in phantom in FIG. 8 as VC0–VC7 811. Each virtual channel includes a multiplexer at the upstream port 813 and a multiplexer at each downstream port 851 and 853, to allow access to each switch port. A serializer-deserializer (SERDES) 810, 855, and 857 is required for each port, since Express is a serial interface. Also included in FIG. 8 are single input buffer sets 831, 839, and 841 (as illustrated in FIG. 7) per port per virtual channel having improved management requirements and ordering rules operable such that transactions exit the buffers in the same order as they entered the buffers according to this invention. This can be accomplished for the input buffer set with pointers that can be updated following each operation such that transactions of all types exit the buffer set in the same order or sequence in which they entered. Only a single input buffer set 831 is provided for handling traffic, per virtual channel, in the downstream path from the upstream port. Separate single input buffer sets 839 and 841 are provided at each of the downstream ports, per virtual channel, for handling traffic in the upstream direction.

Also included in FIG. 8 are a set of output "ping-pong" buffers 819, 843, and 845 at each port for each virtual channel operable such that transactions exit the buffers in the same order as they entered. One of the output buffers holds the next transaction to feed the SERDES at the port output, during which time the following transaction to be serialized can be transferred into the other buffer. These sets of input and output buffer sets are provided for each port and for each virtual channel. Included also in FIG. 8 is a non-blocking cross-bar or Xbar switch circuit 833 to allow for steering transactions flowing out of the input buffers toward their target buffers at the appropriate target output ports. This non-blocking switch 833 allows transfers to occur between any two combination of ports of the switch while simultaneously allowing transfers to occur between any other combinations of sets of two ports of the switch. Also shown in FIG. 8 are I/O Flow Control Credit and buffer ordering state machines 816, 847, and 849 that are utilized to control the input and output buffer sets and management of the flow control credit information that is shared at each port at each end of the links.

Express defines the capability of up to eight (8) virtual channels (VC0–VC7) 811, where the highest priority VCn can be utilized for isochronous transactions when supported. VC0 is defined for the lowest priority general purpose transactions and VC1–VC7 allowing for other weighted priority traffic. In Express, transactions in different VCs or of different TCs have no ordering requirements relative to each other. An Express device must implement at least one VC (VC0). In order for multiple VCs to gain access to the device's various Express interfaces, VC multiplexers 813 and 851 and 853 must be provided at the upstream port 805 and at each of the downstream ports 859 and 861, respectively.

Also included in FIG. 8 is all of the various Express Switch Control logic 821, consisting essentially of the Arbiter Control, Isochronous Control, I/O Flow Credit Control, Steering and Other Control Logic. Internal arbitration is required between the output of the input buffer sets 831, 839, and 841 on each virtual channel and the input of the output buffer sets 819, 843, and 845 on each virtual channel. The arbiter selects the packets that flow through the X-Bar switch to the output buffer sets. Once transactions have made it to the output buffers at the output port of each virtual channel, internal arbitration again is required to arbitrate between virtual channels for access to the port SERDES to multiplex and serialize the winning transaction out over the appropriate Express serial I/O link.

An Express switch device is a very complex device. As illustrated, improving the transaction buffering and ordering requirements for Express, as herein disclosed, allows a much improved, less complex, less costly, and higher performance buffer design and control as shown in FIG. 7 and FIG. 8. Managing only one input buffer set and only one output buffer set (per port per virtual channel) with improved ordering requirements is much less complex than managing multiple input and output buffer sets (per port per virtual channel) which have the much more complex ordering and control requirements as currently defined in the Express specification. The concepts, descriptions and examples for the invention have been described with application for PCI Express. However, the concepts of this invention are applicable to any serial I/O interconnect such as Rapid I/O and Hyper-Transport implementations.

Figure 9:
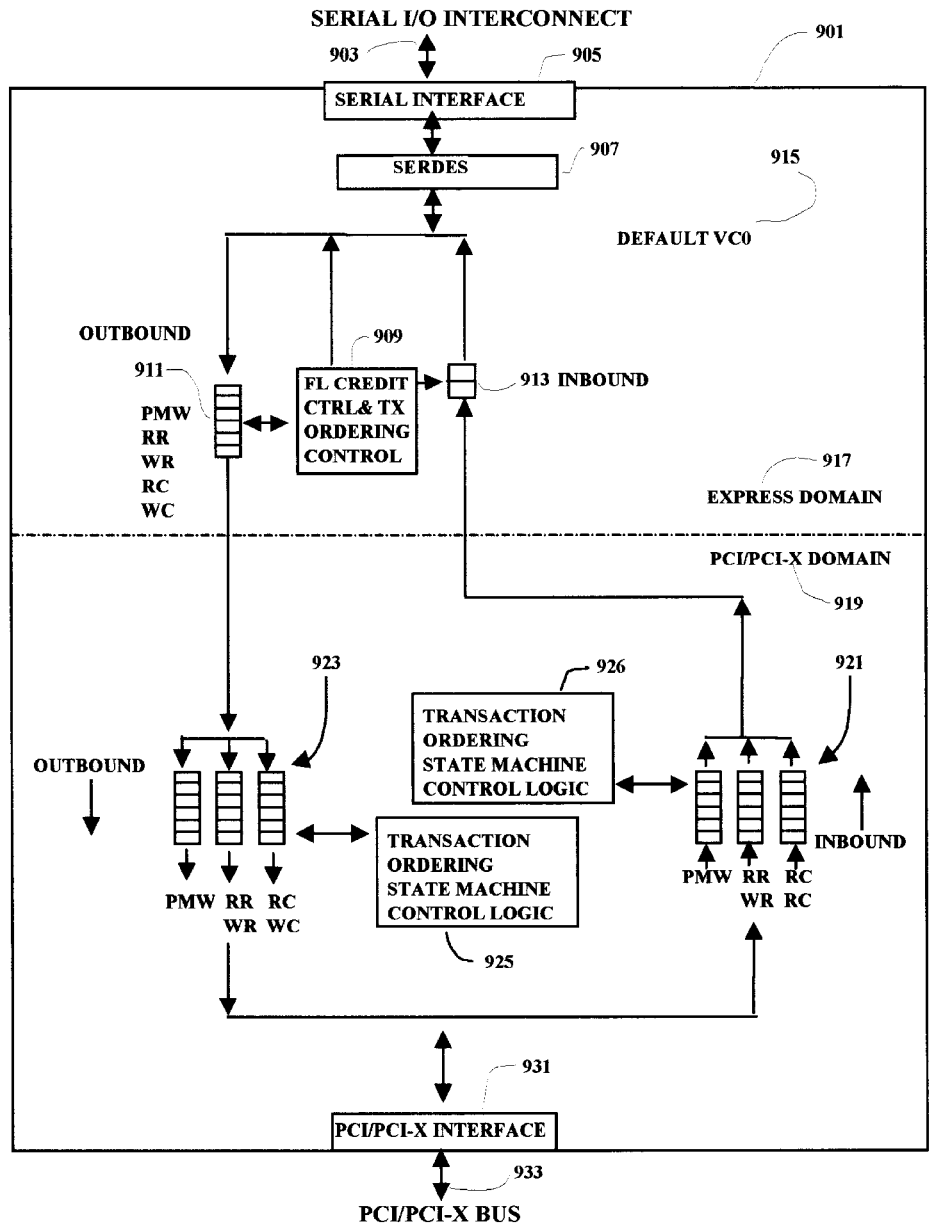
FIG. 9 illustrates an exemplary Express-PCI bridge implementation utilizing improved Express transaction ordering and buffer management in the Express domain, and utilizing improved transaction ordering and buffer management in the PCI/PCIX domain.

FIG. 9 illustrates a significantly improved embodiment of an Express-PCI bridge 901, which provides a serial I/O interconnect 903 and serial interface 905, and a SERDES 907 for serializing and deserializing the Express interface. The Express-PCI bridge is divided into two separate domains. The upper portion of the bridge 901 is the Express domain 917, and the lower portion of the bridge is the PCI/PCIX domain 919. Any PCI/PCIX transaction bypassing requirements are handled within the PCI/PCIX domain of the Express-PCI bridge. The bridge of FIG. 9 illustrates only one secondary port, but also could include multiple secondary PCI/PCIX ports. Also included in the Express domain of the bridge is a single set of outbound buffers 911 (outbound with respect to the Root Complex) and an inbound set of buffers 913. The outbound buffer set 911 and the inbound buffer set 913 in the Express domain of FIG. 9 correspond to the input buffers 704 and output buffers 710, respectively, as illustrated in FIG. 7 for Express devices. Also illustrated in FIG. 9 is a set of I/O Flow control credits and transaction ordering control 909 to manage the credits that are shared across the Express link and to manage the single outbound 911 and inbound 913 buffer sets. All outbound traffic entering the Express-PCI bridge in the outbound direction is re-mapped to TC(0), since it is targeting the PCI/PCIX domain. Since the PCI domain is within one plane, it does not comprehend virtual channels. Since this Express interface in the outbound direction is targeting the PCI/PCIX domain of the bridge, only the Default virtual channel VC0 is included.

FIG. 9 also illustrates the PCI/PCIX bus interface 931 producing the PCI/PCIX bus 933. Also included are three sets of outbound transaction buffers 923 in the PCI/PCIX domain 919. One set is provided for posted memory write transactions (PMW), another set is provided for read and write requests (RR and WR), and the third set of buffers are provided for read and write completions (RC and WC). Each of the three buffer sets provide transaction ordering as defined in the table 401 in FIG. 4 and as improved by this invention. Also the transaction ordering between the three buffer sets are as defined in the table 401 in FIG. 4 and as improved by this invention. Also illustrated in FIG. 9 are three additional sets of buffers for the inbound direction 921. As with the outbound direction, the inbound buffers include one set that is provided for posted memory write transactions, another set is provided for read and write requests, and the third set of buffers are for read and write completions. Again each of the three buffer sets provide transaction ordering as defined in the table 401 in FIG. 4 and as improved by this invention. The actual number of buffers utilized in each of the buffer sets 921 and 923 is implementation dependent, as long as the transaction ordering rules are met.

Also included in FIG. 9 is a set of transaction ordering state machine control logic 925 for the outbound direction which implements the transaction ordering requirements defined in the table of FIG. 4 and as improved by this invention, and controls the transactions flowing through the buffer sets flowing in the outbound direction (buffers 923). A set of transaction ordering state machine control logic 926 for the inbound direction implements the transaction ordering requirements defined in the table of FIG. 4, and controls the transactions flowing through the buffer sets in the inbound direction (buffers 921). In this manner the transaction ordering requirements of legacy PCI/PCIX adapters installed behind the Express-PCI bridge (on the PCI side) are handled by the buffer and buffer management and transaction ordering state machine control logic within the PCI/PCIX domain 919 of the Express-PCI bridge 901. In the PCI domain, the residual delayed transactions are left at the head of the requesting buffers requiring some transactions not to bypass or to bypass to meet the producer-consumer and deadlock avoidance requirements, respectively, as defined in the ordering requirements in the table of FIG. 4.

As mentioned earlier, the problem with PCI relative to possible deadlocks is that Delayed Read Requests and Delayed Write Requests leave residual transactions (once the transaction has been attempted) at the head of buffers which can cause deadlocks if proper bypassing rules are not followed. Examples of residual transactions are Delayed Requests (Delayed Read and Delayed Write) which have been accepted across a device interface. Once a Delayed Request is attempted across a bus from a first device to a second device, the request is now in the second device, but also leaves the same Delayed Request at the head of the queue in the first device. The delayed request must continue to be attempted from the first device to the second device until the completion transaction becomes available. Once the completion transaction is available and the delayed request completes across the bus, the Delayed Request in the first device is destroyed, being replaced by the Delayed Completion transaction now in the first device moving in the opposite direction. Therefore for PCI, delayed request transactions result in residual delayed requests at the head of the buffer queues in the requesting device. These residual requests require bypassing rules in order to allow certain transactions to be able to bypass these residual transactions to avoid deadlocks. Transactions that require such bypass to avoid deadlocks are the intersection of Row A and Columns 3–6 and the intersection of Rows D–E and Columns 3–4 in the table of FIG. 4.

The entries in table 401 of FIG. 4 are utilized in the PCI/PCIX domain of FIG. 9. The improved table entries are for the request transactions (RR and WR) for the four entries at the intersection of Rows B and C and Columns 3 and 4. The PCI/PCIX specifications and the current Express specification specify that these entries are "Y/N", that is there are no ordering requirements between the first and second transaction of a sequence. As herein disclosed, these entries need to be "No" (the second transaction must not be allowed to pass the first transaction) in the inbound (toward the system processor) direction. These entries can remain the same as currently specified in PCI/PCIX for the outbound direction (away from the system processor). If these entries for the inbound direction were to remain as "Y/N", this would mean that PCI devices could introduce multiple delayed requests into the Express domain of the Express-PCI bridge and into the Express fabric. This could be a problem when peer PCI devices are installed behind PCIPCI bridges designed to PCI Specification Revision 2.0 and these "2.0" bridges are behind (downstream from) the Express-PCI bridges. The 2.0 bridges will cause stalling of delayed requests headed in the outbound direction in the Express-PCI bridges when there are memory writes headed in the inbound direction in the 2.0 bridge resulting in congestion in the Express fabric and potentially system crashes. By changing these table entries to "No" in the inbound direction, this restricts the PCI bus under an Express-PCI bridge to introducing only one delayed request at a time into the Express domain thus avoiding this problem. The other table entries in FIG. 4 are the same as that defined in the PCIX specification for PCI/PCIX devices. Thus, the PCI/PCIX domain of the Express-PCI bridges meet the existing legacy PCI/PCIX transaction ordering rules assuring the avoidance of deadlocks (including the case of peer—peer PCI/PCIX devices installed behind Express-PCI bridges).

Figure 10:
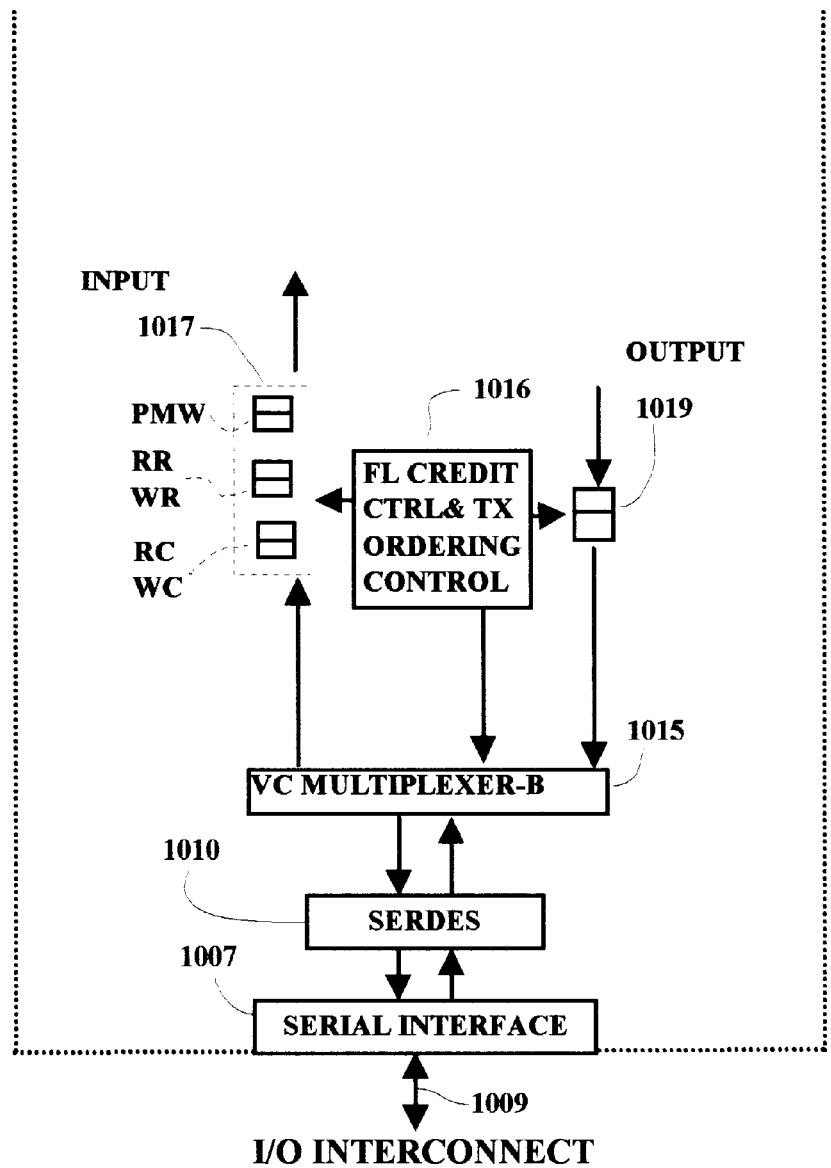
FIG. 10 illustrates a portion of the Express switch logic for one of the Express switch input ports as shown in FIG. 8 with an improved method for defining and managing flow control credits.

FIG. 10 illustrates a portion of the Express switch logic for one of the Express switch input ports as shown in FIG. 8. Included in FIG. 10 is the VC Multiplexer 1015, SERDES 1010, and the Serial Interface 1007, producing the Express I/O Interconnect 1009. Also included in FIG. 10 is an improved input buffer set 1017 which utilizes the improved ordering rules for Express devices as defined in this invention. I/O Flow Control Credits and Transaction Ordering Control 1016 and the output buffer set 1019 are also illustrated. As shown, the various transaction types including PMW, RR, WR,RC, and WC, are all able to flow through the input buffer sets. All five transaction types can also flow through the output buffer sets. In this example six input buffers are included, with two reserved for PMW, two buffers reserved for requests (RR and WR), and two buffers reserved for completions (RC and WC). A set of flow control credits would be allocated for PMW, a set of flow control credits allocated for requests (RR and WR), and a set of flow control credits allocated for completions (RC and WC). The I/O Flow Control Credits and transaction ordering control 1016 in FIG. 10 are utilized to control the input and output buffer sets and management of the flow control credit information that is shared at each port at each end of the links. There are six flow control credit types, two for posted memory write (one for headers and one for data), two for requests (one for header and one for data), and two for completions (one for header and one for data). Each virtual channel has its own independent set of flow control credit mechanism for controlling the flow of transactions between links.

In FIG. 10, if a significant number of PMW transfers are attempted requiring a significant number of PMW credits before another type of transaction (requests or completions) enters the port and into the input buffers, then two-thirds of the buffers (since four buffers in this example would be reserved for requests and completions) and two-thirds of the flow control credits (since credits would be reserved for use for the request and completion transactions) sit idle as the PMW transfers flow through the input buffers. Flow control credits are periodically updated between the Express ports at each end of the links as defined in the Express specification. Even though the input buffer set includes the improved approach as illustrated in FIG. 10, there is still the need to allocate the credits for each transaction type (posted memory writes, requests, and completions), as the three transaction types flow through the single input buffer set in FIG. 10.

The improved single input and output buffer set as shown in FIG. 10, illustrates a new improved approach for defining, assigning, and managing flow control credits, which improves the flow control logic, provides significant improvement in Express performance and reduces latency. This can be accomplished by taking advantage of the fact that the input and output buffer sets in FIG. 10 are strictly ordered with transactions exiting the buffers in the same order as they entered the buffers. The six credit types (PMW header and PMW data, Request header and Request data, and Completion header and Completion data) can be redefined and managed as only two credit types (Transaction header and Transaction data). Thus, in FIG. 10 the PMW credits, Request credits, and Completion credits would all become Transaction credits.

Without this improvement, if a large number PMW data transfers are attempted in sequence at a given input port before any other type of transactions (requests of completions) were to flow through the buffer set, then before all of the PMW transactions can be moved across the switch, the arbiter would go around the arbitration loop (using some fairness algorithm) to all of the other input port buffers and all of the other virtual channels, giving each a chance for access to their selected output port for moving their transactions across the switch. Depending on the number of PMW transactions being attempted, this could result in a number of arbitration loops (to all ports and virtual channels) before all of the PMW transactions can be moved across the switch through the given port. However, in accordance with the present disclosure, all six of the buffers could be utilized for whichever transactions come through the six buffers regardless of the transaction type in whatever combination they flow through the buffers (in strict order). This avoids the situation where two thirds of the input buffers and two thirds of the flow control credits sit idle during block transfers.

With this disclosure, there is no need to allocate credits based on transaction types (since the six transaction types (including both header and data) for PMW, requests, and completions will now be considered as just two generic flow credit types for transaction header and transaction data. In this manner all six of the available buffers and all of the available flow control credits can be utilized, resulting in data being able to be moved across Express switches (and other Express devices) with lower latency and improved performance. Also, for a given chip size and buffer space allocation, it can be a design tradeoff as to the number of buffers and size of buffers to be allocated for each set of input buffers per port, to allow possible room in a chip for more virtual channels if desired. Regardless of the design tradeoffs selected, moving a significantly larger number of sequential PMW transaction across the switch while requiring fewer cycles around the arbitration loop, results in lower latency and improved performance.

For backward compatibility the switch will handle both of the flow control mechanisms, the previous approach of six credit types for PMW, requests and completions, plus the improved approach with two transaction credit types (transaction header and transaction data). During link configuration or link training, initially a link will utilize the existing flow control credit method. During link training, if both ends of the link can support the improved approach, then both ends of the link will switch to the new approach in accordance with the present disclosure. As transactions move across a switch through the input side of a first port and through the output side of a second port, the input side of the first port could be utilizing the improved flow control method as herein disclosed, while the output side of the second port could be utilizing the existing flow control method according to the Express specification.

Also, as transactions move across the switch through the input side of a first port and through the output side of a third port, the input side of the first port could be utilizing the improved flow control method and the output side of the third port could also be utilizing the improved flow control method. Both the input and output side of the same port of a switch must utilize the same flow control mechanism as the other end of the serial link it is connected to.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into system memory and executed to achieve the beneficial results as described herein. Accordingly, the present invention is not intended to be limited to the specific form or example set forth herein, but on the contrary, it is intended to cover such alternatives, modifications, and equivalents, as can be reasonably included within the spirit and scope of the invention.

What is claimed is:

1. A method for processing information transactions of multiple transaction types from a first device to a second device across a link between said first device and said second device, said information transactions to and from said first device being subject to a set of ordering rules requiring certain ones of said transaction types to bypass other ones of said transaction types, said method comprising:

determining an amount of transaction flow control credits required to store first transaction information originating at said first device;

sending a periodic credit message from said second device to said first device, said credit message containing transaction flow control credits for an amount of currently available storage space in said second device, said transaction flow control credits using a single transaction credit type for all of said transaction types; and transferring said first transaction information from said first device to said second device without requiring compliance with said ordering rules applicable to said first device if said currently available transaction flow control credits are sufficient to store said first transaction information.

2. The method as set forth in claim 1 wherein said method is repeated periodically if said currently available transaction flow control credits are insufficient to store said first transaction information.

3. The method as set forth in claim 1 and further including:

storing said first transaction information in storage in said first device; and removing said first transaction information from said first device when said first transaction information is transmitted to said second device.

4. The method as set forth in claim 3 and further including storing said first transaction information in storage in said second device when said first transaction information is transmitted to said second device.

5. The method as set forth in claim 1 and further including:

determining which of a plurality of flow control credit methods are supported by said first and said second devices, said flow control credit methods including a first flow control credit method and a second flow control credit method;

selecting said first flow control credit method if said first and said second devices support said first flow control credit method, said first flow control credit method being operable for utilizing two flow control credit segments including a transaction header credit segment and a transaction data credit segment; and selecting said second flow control credit method if one or both of said first and second devices supports only said second flow control credit method, said second flow control credit method being operable for utilizing more than one flow control credit type.

6. The method as set forth in claim 5 wherein available buffer space is allocated and managed for said first flow control method based on two flow control credit segments including transaction header credits and transaction data credits.

7. The method as set forth in claim 5 wherein said flow control credit types for said second flow control credit method include credit types for posted memory write header credits, posted memory write data credits, request header credits, request data credits, completion header credits and completion data credits.

8. The method as set forth in claim 6 wherein available buffer space is allocated and managed for said second flow control method based on more than one flow control credit types including posted memory write header credits, posted memory write data credits, request header credits, request data credits, completion header credits and completion data credits.

9. An information processing system for transferring information transaction requests of multiple transaction types from a first device to a second device across a link between said first device and said second device, said information transactions to and from said first device being subject to a set of ordering rules requiring certain ones of said transaction types to bypass other ones of said transaction types, said system comprising:

means for determining an amount of transaction flow control credits required to store first transaction request information originating at said first device;

means for sending a periodic credit message from said second device to said first device, said credit message containing transaction flow control credits for an amount of currently available storage space in said second device, said transaction flow control credits using a single transaction credit type for all of said transaction types; and means for transferring said first transaction information from said first device to said second device without requiring compliance with said ordering rules applicable to said first device if said currently available transaction flow control credits are sufficient to store said first transaction information.

10. The information processing system as set forth in claim 9 wherein said processing is repeated periodically if said currently available transaction flow control credits are insufficient to store said first transaction information.

11. The information processing system as set forth in claim 10 and further including:

storage means for storing said first transaction information in said first device; and means for removing said first transaction information from said first device when said first transaction information is transmitted to said second device.

12. The information processing system as set forth in claim 11 and further including means for storing said first transaction information in said second device when said first transaction information is transmitted to said second device.

13. The information processing system as set forth in claim 9 and further including:

means for determining which of a plurality of flow control credit methods are supported by said first and said second devices, said flow control credit methods including a first flow control credit method and a second flow control credit method; and means for selecting said first flow control credit method if said first and said second devices support said first flow control credit method, said first flow control credit method being operable for utilizing two flow control credit segments including a transaction header credit segment and a transaction data credit segment.

14. The information processing system as set forth in claim 11 and further including means for allocating and managing available buffer space based on a first flow control method using only two flow control credit segments.

15. The information processing system as set forth in claim 13 and further including means for selecting said second flow control credit method if one or both of said first and second devices supports only said second flow control credit method, said second flow control credit method being operable for utilizing more than one flow control credit type.

16. The information processing system as set forth in claim 15 wherein said flow control credit types for said second flow control credit method include credit types for posted memory write header credit, posted memory write data credit, request header credit, request data credit, completion header credit and completion data credit.

17. The information processing system as set forth in claim 16 and further including means for allocating and managing available buffer space based on a second flow control method using more than one flow control credit type.

* * * * *